United States Patent [19]
Holub et al.

[11] Patent Number: 5,518,349
[45] Date of Patent: May 21, 1996

[54] MEMBER FOR FIXING BY RADIAL EXPANSION

[75] Inventors: Serge Holub, Orvault; Jean-Pierre Coue, La Chapelle sur Erdre; Bernard Ollivaud, Le Cellier, all of France

[73] Assignee: Gec Alsthom Systemes et Services SA, Paris, France

[21] Appl. No.: 379,964

[22] Filed: Jan. 27, 1995

[30] Foreign Application Priority Data

Jan. 28, 1994 [FR] France .................................. 94 00964

[51] Int. Cl.⁶ ........................................................ F16B 13/04
[52] U.S. Cl. ........................................... 411/34; 411/60
[58] Field of Search .............................. 411/34–38, 55, 411/60, 62, 72, 901, 902, 903

[56] References Cited

U.S. PATENT DOCUMENTS

| | | |
|---|---|---|
| 2,236,079 | 3/1941 | Wipper . |
| 3,017,800 | 1/1962 | Cohen ................................ 411/34 |
| 4,789,283 | 12/1988 | Crawford ............................ 411/34 |
| 5,180,264 | 1/1993 | Farwell .............................. 411/60 |
| 5,271,700 | 12/1993 | Le Goff ............................. 411/34 |

FOREIGN PATENT DOCUMENTS

| | | |
|---|---|---|
| 1056501 | 3/1954 | France . |
| 2647163 | 11/1990 | France . |
| 137527 | 10/1952 | Sweden ............................. 411/34 |
| 628912 | 9/1949 | United Kingdom . |
| 774002 | 5/1957 | United Kingdom ................. 411/34 |

Primary Examiner—Flemming Saether
Attorney, Agent, or Firm—Sughrue, Mion, Zinn, Macpeak & Seas

[57] ABSTRACT

A member for fixing by radial expansion, the member comprising a pull rod having an expandable plug mounted thereon and surrounded over its entire length by a split ring, one end of the pull rod being connected to an endpiece, said plug being sandwiched between said endpiece and a thrust part also mounted on said pull rod, the member further including means enabling said endpiece to be moved towards said thrust part in such a manner as to compress the plug axially, thereby causing both it and said split ring to expand radially, wherein when said plug is uncompressed and at rest, said split ring is longer than said plug, said thrust part including a portion that constitutes a ram suitable for penetrating into said split ring, and wherein the end of said split ring includes a radially inwardly extending collar having the expandable plug and said endpiece bearing against opposite sides thereof.

13 Claims, 2 Drawing Sheets

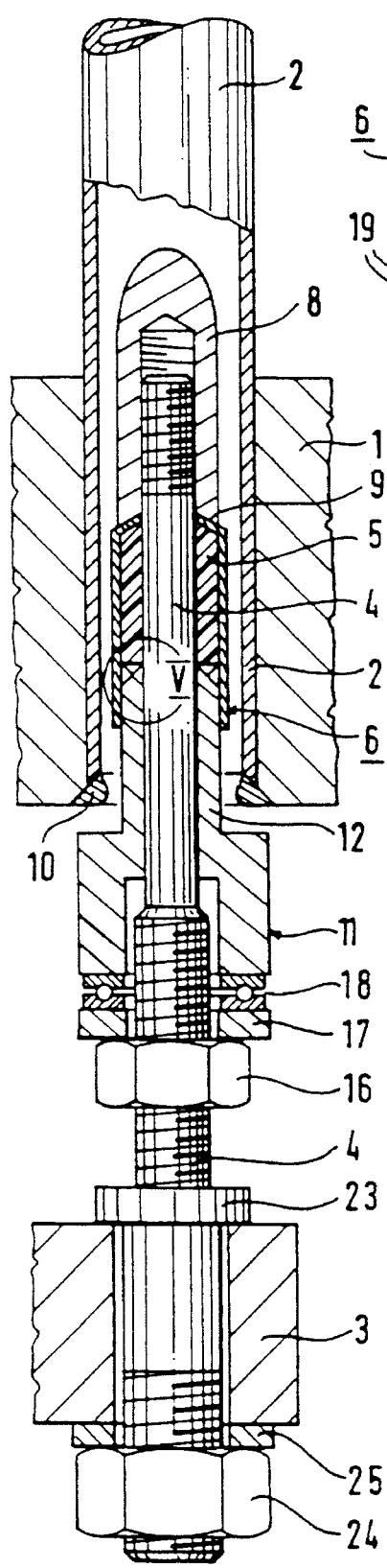
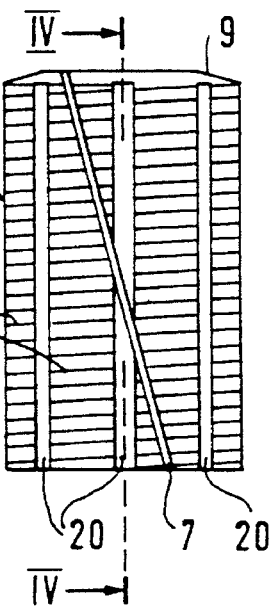
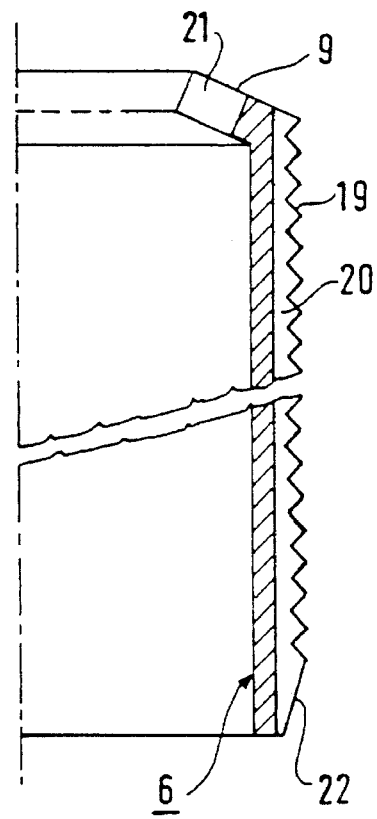
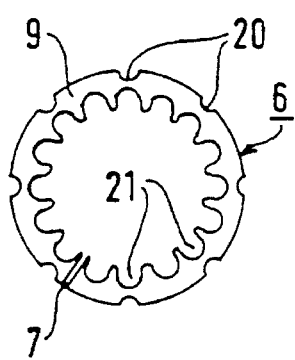
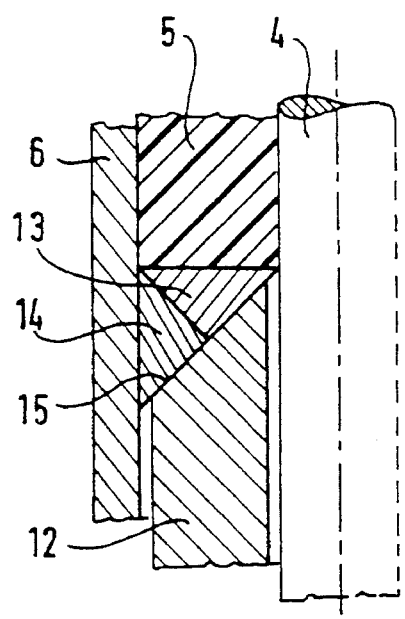

5,518,349

MEMBER FOR FIXING BY RADIAL EXPANSION

FIELD OF THE INVENTION

The present invention relates to a member for fixing by radial expansion.

The fixing member of the invention is designed to be received and securely fixed in a cylindrical hole in any kind of wall so as to make it possible to attach or suspend any type of object therefrom. The axis of the fixing member may be horizontal or vertical, or it may be in some other position. Nevertheless it is particularly well adapted to being fixed in a hole having a vertical axis and formed in a horizontal wall, and thus for suspending an object, with the fixing member then operating in traction.

One particular intended application consists in suspending a remote-handling arm that is suspended from a horizontal tube plate of a steam generator for the purpose of inspecting the tubes. The arm is then suspended from four fixing members, and as the tubes are inspected, the arm is displaced so as to enable all of the tubes to be inspected. The fixing members for the arm must then be capable of being released without causing damage so as to be reused for a new anchor point by radial expansion in a different location in the tube plate.

The fixing member of the invention is particularly well adapted to such an application, however it can be used for any other need, and in particular for suspension on a vertical wall.

BACKGROUND OF THE INVENTION

French patent 2 647 163 discloses a fixing member comprising a pull rod having an expandable plug mounted thereon and surrounded by a split ring whose length is shorter than the length of the plug, the expandable plug bearing against an endpiece associated with one end of the pull rod.

A bush is threaded onto the other end of the pull rod and bears against the expandable plug via a thrust washer. Finally, a nut is screwed onto the pull rod and enables the endpiece and the bush to be moved towards each other, thereby shortening the plug axially and thus expanding it radially together with the split ring that surrounds it. The inside surface of the split ring has a helical groove.

In that configuration, the axial shortening of the expandable plug is limited to the thrust of the endpiece and of the thrust washer against the opposite faces of the split ring, thereby putting a limit on radial expansion. In addition, at high pressures, there exists problems of the plug creeping and escaping between the endpiece and the circular wall of the hole in which the member is inserted, and also between the thrust washer and said wall, thus making subsequent disassembly and reuse difficult, because of failure of the split ring to shrink radially. It is possible to pull the member out of the hole but only at the risk of damaging the surface thereof, and that is not acceptable when the hole is a tube in a tube plate.

OBJECT AND SUMMARY OF THE INVENTION

The object of the present invention is to improve performance, and it provides a member for fixing by radial expansion, the member comprising a pull rod having an expandable plug mounted thereon and surrounded over its entire length by a split ring, one end of the pull rod being connected to an endpiece, said plug being sandwiched between said endpiece and a thrust part also mounted on said pull rod, the member further including means enabling said endpiece to be moved towards said thrust part in such a manner as to compress the plug axially, thereby causing both it and said split ring to expand radially, wherein when said plug is uncompressed and at rest, said split ring is longer than said plug, said thrust part including a portion that constitutes a ram suitable for penetrating into said split ring, and wherein the end of said split ring includes a radially inwardly extending collar having the expandable plug and said endpiece bearing against opposite sides thereof.

BRIEF DESCRIPTION OF THE DRAWINGS

An embodiment of the invention is described below with reference to the accompanying drawings, in which:

FIG. 1 is an axial section through a fixing member of the invention shown inserted in a tube of a tube plate, and shown in its non-expanded, or rest state;

FIG. 2 shows one of the parts of the fixing member, namely the split ring;

FIG. 3 is a plan view of FIG. 2;

FIG. 4 is a fragmentary section view on IV—IV of FIG. 2;

FIG. 5 is a view on a larger scale showing a detail V of FIG. 1; and

MORE DETAILED DESCRIPTION

Figure 6:
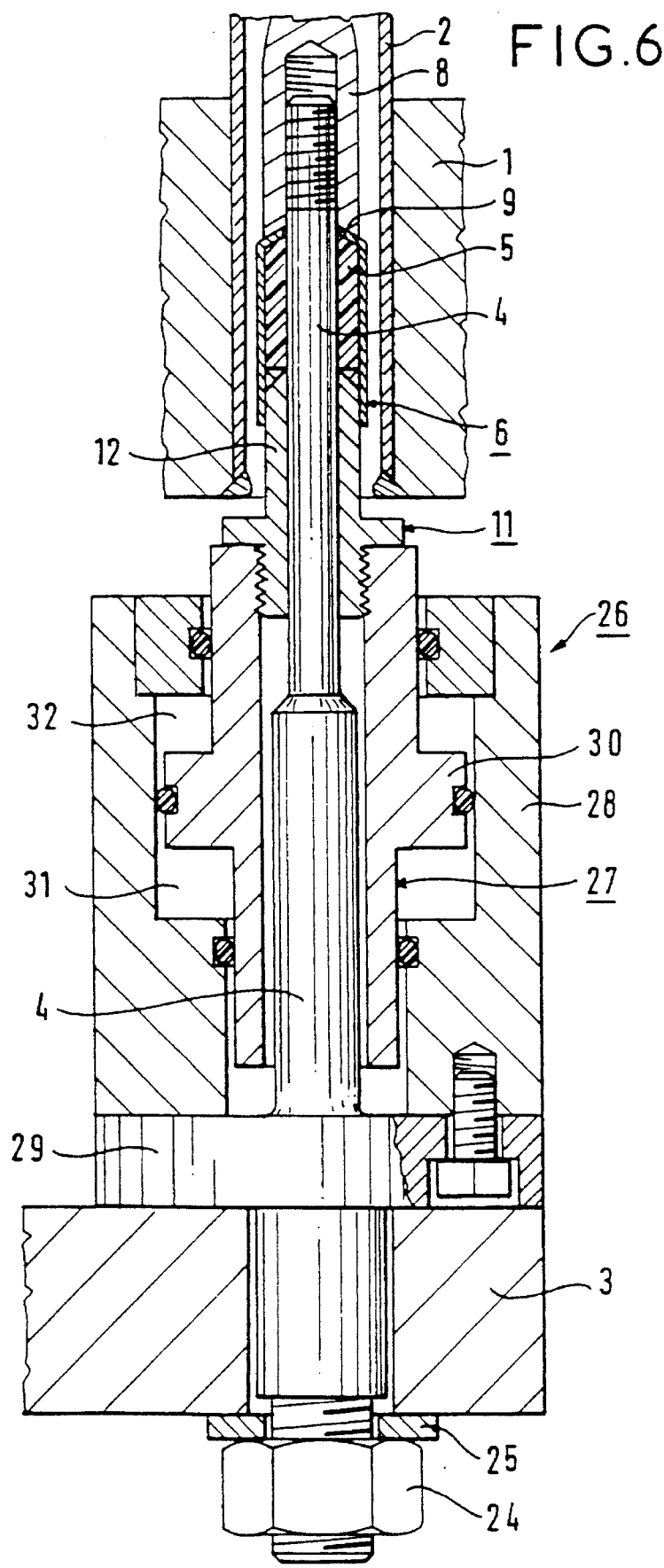
FIG. 6 shows a variant of FIG. 1.

With reference to FIG. 1, there can be seen a portion of a tube plate 1 and of a tube 2.

A radial expansion fixing member is inserted in the tube 2 for the purpose of suspending a part 3 from the tube plate 1. In the present example, the part 3 is a plate having each of its four corners suspended from such a fixing member.

The fixing member comprises firstly a pull rod 4 on which an expandable plug 5 is mounted, the plug being surrounded over its entire length by a split ring 6.

As can be seen in FIG. 2, the split 7 is not parallel to the axis, but is oblique. In addition, the split ring 6 is at least as long as, and as shown herein is preferably longer than the expandable plug in its rest position. One end of the pull rod 4 is fixed to an endpiece 8, e.g. by screw engagement, and the split ring 6 which includes a radially inwardly extending collar 9 bears against the endpiece 8. The expandable plug 5 itself bears against the collar 9. The expandable plug 5 is thus positioned on the pull rod 4 and relative to the split ring 6, and the collar 9 prevents the split ring 6 from sliding rearwards when the fixing member is inserted in the tube 2, supposing that during such insertion the ring bumps into a narrowing such as a weld fillet 10.

The pull rod 4 also carries a thrust part 11. This thrust part 11 includes a ram portion 12 that penetrates inside the split ring 6. Thus, the diameter of the ram 12 is no greater than the inside diameter of the split ring 6 before any radial expansion thereof. Between the end of the ram 12 and the expandable plug 5, both engaged inside the split ring 6, there are disposed two anti-extrusion split rings 13 and 14. FIG. 5 shows this detail more clearly. Naturally, the splits in the two anti-extrusion split rings 13 and 14 (not shown in the figures) are offset relative to each other. The end of the ram 12 forms a conical annular thrust surface 15 bearing against the anti-extrusion rings 13 and 14.

Finally, a nut 16 mounted on the threaded portion of the pull rod 4 bears against the opposite end of the thrust part 11 via a washer 17 and a thrust ball-bearing 18.

Thus, screwing the nut 16 along the pull rod 4 enables the endpiece 8 and the thrust part 11 to move towards each other, thereby sandwiching the expandable plug 5 causing it to be compressed axially and consequently causing it to expand radially, thus also causing the split ring 6 to expand radially. The thrust ball-bearing 18 prevents the thrust part 11 rotating while the nut 16 is being screwed along the pull rod 4.

By using the anti-extrusion rings 13 and 14 in combination with the fact that the split ring 6 is longer than the expandable plug 5, it is possible to avoid any extrusion of the expandable plug out from the split ring. The collar 9 also contributes to this effect. This makes it possible to increase axial compression considerably, thereby increasing radial expansion, and consequently also increasing the force required to pull the member out. In addition, the absence of any extrusion makes the fixing member suitable for disassembly and reuse.

Advantageously, in order to improve the efficiency with which axial pressure is transformed into radial pressure, the inside surface of the split ring 6 is smooth so as to avoid any axial friction.

In contrast, the outside surface of the split ring 6 may be roughened by stripes, knurling, or by forming a helical groove 19 as shown in FIGS. 2 and 4, thereby ensuring that the fixing member is securely held on radial expansion. In a fixing member made for test purposes, the split ring includes a helical groove 19 at a pitch of 1 mm.

In order to ensure better radial elasticity for the split ring, thus enabling better radial retraction thereof during loosening for disassembly purposes, the outside surface of the split ring 6 carries a plurality of grooves 20 extending parallel to the longitudinal axis of the ring, and the collar includes notches 21. By virtue of considerable radial elastic deformation, these measures make it possible, during successive insertions and extractions, to move past any possible narrowing in a tube 2, such as a weld fillet 10, for example.

For the same purpose of getting past a narrowing during extraction, the outside surface of the split ring 6 includes a chamfer 22 at its end adjacent to the nut 16. The collar 9 of the split ring 6 serves in operation to transfer the axial force transmitted by the endpiece 8 to the ring 6. Tests have given an axial extraction force of about 2500 daN. This result was obtained without damage to the inside wall of the tube and with a nominal clamping torque on the nut 16 of about 5 daN×m. Seen from the part 3, the axial elastic deformation is about 0.5 mm under 1000 daN.

The part 3 to be supported is connected to the pull rod 4 whose end remote from the endpiece 8 includes a threaded portion. The part 3 bears against a shoulder 23 of the pull rod and is held against said shoulder by a nut 24 with an interposed washer 25.

When it is necessary to install the fixing member and to anchor it remotely, e.g. in the event of remote handling or of automation, the clamping nut 16 may be omitted and the required compression force on the thrust part 11 may be obtained, by fitting any type of controllable positive actuator, e.g. one that is controlled electrically, pneumatically, hydraulically, electromagnetically, . . .

Thus, FIG. 6 shows an example in which the nut 16 is replaced by a double-acting actuator 26 having a hollow piston rod 27. The actuator comprises an outside body 28 that is connected to an enlarged bearing surface 29 of the pull rod 4. The hollow piston rod 27 is secured to the thrust part 11 and has the pull rod 4 passing therethrough. The hollow piston rod 27 has an integral piston 30 thereon which subdivides the inside of the body 28 into two chambers 31 and 32. Applying hydraulic fluid to the chamber 31 causes the endpiece 8 to move towards the thrust part 11, thereby axially compressing the plug 5 and consequently causing both it and the split ring 6 to expand radially.

Disassembly is performed by applying pressure to the chamber 32.

We claim:

1. A member for fixing by radial expansion, the member comprising a pull rod having an expandable plug mounted thereon and surrounded over its entire length by a split ring, one end of the pull rod being connected to an endpiece, said plug being sandwiched between said endpiece and a thrust part also mounted on said pull rod, the member further including means enabling said endpiece to be moved towards said thrust part in such a manner as to compress the plug axially, thereby causing both it and said split ring to expand radially, wherein, when said plug is uncompressed and at rest, said split ring is longer than said plug, said thrust part including a portion that constitutes a ram suitable for penetrating into said split ring, and wherein the end of said split ring includes a radially inwardly extending collar having the expandable plug and said endpiece bearing against opposite sides thereof.

2. A fixing member according to claim 1, wherein the inside surface of said split ring is smooth.

3. A fixing member according to claim 1, wherein its longitudinal split of said split ring is not parallel to the axis, but is oblique.

4. A fixing member according to claim 1, wherein said collar includes notches.

5. A fixing member according to claim 1, wherein the outside surface of said split ring includes grooves parallel to its longitudinal axis.

6. A fixing member according to claim 1, wherein said split ring includes a chamfer on its outside surface adjacent to its end opposite the collar.

7. A fixing member according to claim 1, wherein the outside surface of said split ring is roughened by stripes, knurling, or the provision of a helical groove.

8. A fixing member according to claim 1, wherein two anti-extrusion split rings are disposed within said split ring between the end of the ram and said expandable plug.

9. A fixing member according to claim 8, wherein the splits in said anti-extrusion split rings are offset relative to each other, the end of said ram having a conical annular surface bearing against the two rings.

10. A fixing member according to claim 1, wherein said pull rod includes means at its end opposite from its end connected to said endpiece for the purpose of securing it to a part to be supported.

11. A fixing member according to claim 1, wherein said means enabling the endpiece and the thrust part to be moved towards each other comprise a nut mounted on a threaded portion of the pull rod.

12. A fixing member according to claim 11, wherein a thrust ball-bearing is interposed between said nut and said thrust part.

13. A fixing member according to claim 1, wherein said means enabling the endpiece and the thrust part to be moved towards each other comprise a double-acting actuator having an outside body connected to the pull rod and a hollow piston rod connected to said thrust part and having said pull rod passing therethrough, the piston rod including an enlarged piston-forming bearing surface that subdivides the inside of the outer body into two chambers.

\* \* \* \* \*